United States Patent [19]

Rait

[11] 4,358,955
[45] Nov. 16, 1982

[54] LIQUID LEVEL GAUGE

[75] Inventor: Joseph M. Rait, Buffalo, N.Y.

[73] Assignee: Technomadic Corporation, Buffalo, N.Y.

[21] Appl. No.: 192,427

[22] Filed: Sep. 29, 1980

[51] Int. Cl.³ .................. G01K 11/12; G01K 23/02
[52] U.S. Cl. .................................... 73/295; 73/292; 374/142; 248/DIG. 4
[58] Field of Search ............... 73/295, 343 B, 344, 73/292, 356; 116/227; 248/542, DIG. 4

[56] References Cited

U.S. PATENT DOCUMENTS

| | | | |
|---|---|---|---|
| 2,431,827 | 12/1947 | Rado | 116/204 X |
| 2,488,758 | 11/1949 | Binford | 73/DIG. 5 |
| 2,701,964 | 2/1955 | Argabrite | 73/343 R |
| 3,138,023 | 6/1964 | Washburn | 73/295 |
| 3,587,244 | 6/1971 | Wood, Jr. | 73/295 |
| 3,696,675 | 11/1981 | Gilmour | 73/295 |
| 3,864,976 | 2/1975 | Parker | 73/343 B |
| 3,915,112 | 10/1975 | Forester | 116/204 X |

FOREIGN PATENT DOCUMENTS

| | | | |
|---|---|---|---|
| 743409 | 11/1943 | Fed. Rep. of Germany | 73/295 |
| 808290 | 7/1951 | Fed. Rep. of Germany | 73/295 |
| 892118 | 3/1944 | France | 73/295 |
| 2426249 | 12/1979 | France | 73/356 |

*Primary Examiner*—Daniel M. Yasich
*Attorney, Agent, or Firm*—E. Herbert Liss

[57] ABSTRACT

Apparatus for externally determining the level of a mass of flowable material such as liquid or granular material contained in a closed or sealed container having walls of magnetic material includes an elongate strip of thin magnetized metal sheet material coated with a thermochromic substance which varies chromatically with variations in temperature. The elongated strip is applied to the outer surface of the wall of the container in heat conducting relationship thereto by magnetic attraction and extends along the height of the container. The container is exposed to a temperature change either natural, such as that which occurs at sunset and sunrise, or artificially induced. Because of the difference in the rate of heat conduction of the void volume and the filled space of the container, the container wall experiences a temperature gradient which is most pronounced at the interface of the contents and the void space. The temperature of the container wall changes abruptly at the surface of the contents. This change in temperature is readily discernible visually because of the abrupt change in color of the elongated strip at the material interface thus permitting an observer to readily detect the level of the contents of the container.

3 Claims, 2 Drawing Figures

LIQUID LEVEL GAUGE

BACKGROUND OF THE INVENTION

The present invention relates to improvements in external liquid level gauges of the type illustrated and described in U.S. Pat. No. 3,696,675 to A. Scott Gilmour issued Oct. 10, 1972.

The '675 patent discloses an elongate strip of material coated with a substance which varies chromatically with variations in temperature. A layered strip is employed which comprises a base of "Mylar" having a backing of pressure sensitive adhesive and a layer of liquid crystal or other thermochromatic material coated on a base layer of polymeric film. The thermochromatic coated polymeric film layer is secured by an adhesive to the "Mylar" layer. A protective layer to prevent deterioration from ultra violet radiation is provided over the liquid crystal layer. In some presently known gauges of this type other thermochromatic materials, as for example, mercurous oxide are employed.

The contents level with this type of gauge is determined by sensing the temperature differential between the portion of the container wall above and below the surface of the contents. The container wall may be heated by application of hot water, or a cloth saturated with hot water or in any other suitable or desirable manner. Because the liquid absorbs heat at a rate different from that of the gas, air or free space there results a distinct difference in the temperature of the container wall above and below the surface of the liquid.

The thermochromatic material varies in color with variations in temperature. Thus a line of demarcation is produced at the surface of the liquid contents by the differing colors resulting from the temperature differential. It is thus apparent that good heat conduction between the container wall and the temperature sensing thermochromatic material is essential. To some extent the plastic base layer and the adhesive used in present liquid level gauges of the type disclosed in the '675 Patent serve as heat insulators. It would be advantageous to improve the heat conduction between the container wall and the sensing material. Improved heat conduction requires less applied heat and produce greater contrast at the potions above and below the contents level.

This type of gauge is widely used as propane tanks for backyard grills as well as heating units and cook stoves on recreational vehicles. The containers for propane come in different heights. Thus a different length strip is required for each container. In some instances the empty containers are exchanged for full containers rather than being refilled at the time of purchasing the propane. Since the gauge is secured by adhesive, removal results in destruction of the gauge; a new gauge must be attached each time an empty container is exchanged for a full one. A gauge that can be repeatedly removed and replaced or relocated would enable a single length strip to be utilized on containers of differing heights because the gauge on a tall container could be moved vertically downward as the tank is emptied. Furthermore it would be more economical to be able to transfer the gauge from one container to another when an empty container is exchanged for a full one. In addition, when using two or more containers, a single gauge could be used and transferred from container to container.

SUMMARY OF THE INVENTION

The novel improvements in the present invention obviate the disadvantages of present strip type external liquid level gauges. A magnetized base layer which may be of suitable thin metal is coated with a layer of thermochromatic material which changes color in response to a change in temperature. Thus the strip can be readily attached by magnetic attraction to a container of magnetic material like that usually used in liquid fuel tanks and can be repeatedly removed and re-attached. It may be relocated on the container so that a strip gauge can be used on containers of various heights. The gauges can be transferred from container to container when an empty container is exchanged or when two or more containers are being used. The improved heat conduction achieved by the use of a thin metal base and deletion of an adhesive layer results in increased contrast between areas having different temperatures; it will respond more rapidly and/or require application of less heat to the container wall.

The term "liquid" as used herein in accordance with the broader aspects of the invention includes any fluidic substance capable of flowing such as a mass of solid comprising particles capable of flowing, seeking a level and offering no permanent resistance to change of shape. It includes any matter in which the shape of a given mass depends on the containing vessel but the volume is independent thereof.

The principal object of the present invention is to provide an improved, simple, economical direct reading, external liquid level gauge for determining the level of the liquid within a vessel which can be reused and moved from vessel to vessel.

Another object of the invention is to provide an improved, simple, economical, liquid level gauge which can be applied to a closed container without altering the container and without the use of tools or other auxiliary equipment and in which the same gauge can be used on containers differing in height.

A further and more specific object of the invention is to provide a sealed container having a direct reading external liquid level gauge which indicates the location of the surface of the liquid in the container by an abrupt color change in the gauge in response to an abrupt temperature change on the surface of the container at the interface of the liquid within wherein improved heat conduction to the sensing material is achieved.

Other objects and advantages of the invention will be apparent from the following detailed description taken in connection with the accompanying drawings.

DETAILED DESCRIPTION OF THE PREFERRED EMBODIMENTS

Figure 1:
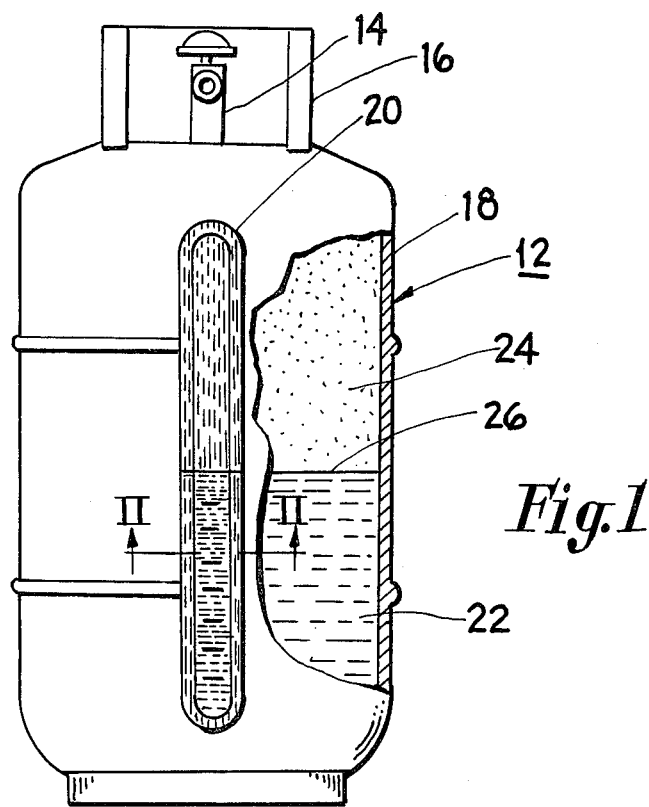
FIG. 1 is a front elevational view, broken away, illustrating the invention.
Figure 2:
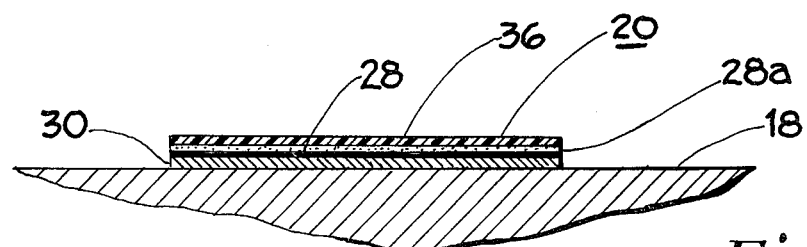
FIG. 2 is a transverse sectional view taken on line II—II of FIG. 1, greatly enlarged.

Referring to FIG. 1 there is shown a tank 12 for storing liquid gas fuel as, for example, liquid propane. The tanks is of generally cylindrical shape having a shut-off and control valve 14 secured in the top wall thereof in sealed relationship to the tank. The valve 14 is utilized for controlling the flow of gas through a conduit (not shown) to where the propane gas is utilized in various appliances as, for example, a cooking stove and/or a heating unit or grill. A cylindrical guard wall 16 may be provided which surrounds and protects the valve 14. Secured to the sidewall 18 of the tank 12 is a liquid level gauge or indicator 20. The liquid level gauge 20 comprises an elongated strip extending heightwise on the tank 12 and will be described in detail hereinafter; it is secured in intimate heat transfer relation to the outer surface of the wall 18. The tank is illustrated as being partially filled with liquid gas 22. The liquid 22 is in intimate contact with the interior surface of wall 18; gas vapor 24 is contained above the interface 26 of the liquid 22. When the tank 12 is exposed to a temperature change a temperature difference will result on the surface of tank 12 between the portion of the tank above the interface 26 and the portion of the tank below the interface 26; there will be an abrupt temperature change at the interface 26. This result is achieved by virtue of the fact that below interface 26 the liquid 22 is in intimate contact with the interior of the wall 18 and conducts heat away from the heated portion of the wall. Thus the wall is in effect cooled by the liquid and is lower in temperature below the interface 26 than it is above the interface 26. Above interface 26 the gas vapor 24 is in intimate contact with the interior of the wall 18; however, this medium does not conduct heat away from the wall as rapidly as the liquid. If the tank 12 is suddenly exposed to cooling, the temperature of the wall 18 below the interface 26 will cool more slowly than the portion of the wall above the interface 26 and, therefore, the wall 18 will be cooler in the section above the interface than below the interface 26.

The above explanation deals exclusively with an occasion in which the liquid or medium below interface 26 has a greater heat conductivity than does the medium above the interface 26. If the medium above the interface 26 has a greater heat conductivity than the medium therebelow the wall 18 will be at higher temperature in the portion below the interface upon heating the container.

The liquid level gauge 20 comprises an elongate base strip 30 of material having a coating of thermochromatic material 28 such as cholesteric liquid crystal compound, mercurous oxide or other suitable and desirable substances spanning the interface 26. The thermochromatic material 28 being chromatically responsive to a temperature change as described herein above, will exhibit an abrupt change in color at the interface 26 where the wall of the tank experiences an abrupt change in temperature when the tank 12 is exposed to a temperature change. This will produce a line of demarcation at the surface of the liquid.

The temperature change may be induced in a number of ways. For example, on a camping trailer where the tank is exposed to the sun there will be a temperature change at sunset and again at sunrise, at which time the level of the liquid within the container will be indicated by a changing color on the level gauge 20. If it is desired to read the liquid level at other times the tank 12 may be exposed to a temperature change by applying water, either warmer than the ambient temperature or colder than the ambient temperature (depending upon the particular thermochromatic material used) to the surface of wall 18 of tank 12 at the area at which the liquid level gauge 20 is affixed. The water may be either poured over this area or the area may be wiped with a dampened cloth. Other and different methods may be employed to induce a temperature change, as for example a heating element. In some applications as, for example, oil immersed electrical equipment such as a transformer, a capacitor or a circuit breaker, the operation of the element itself will heat the liquid and the container will experience a temperature gradient due to this method of heating. In a motor vehicle, for example, when the engine is running the water within the radiator will be heated as it draws heat from the engine and when the engine is stopped there will be a difference in the rate of cooling above and below the interface of the radiator coolant.

The base strip 30 may be a strip of extremely thin, metal, magnetic material 30 and may be of a thickness of the order of 0.001 inches; it is a good heat conductor. A cobalt alloy of steel is an example of a material that can be employed.

The elongate base strip 30 20 may be coated with a suitable thermochromatic material 28 by painting stripping, screen printing or any other suitable or desirable coating method. The material 28 may be liquid crystal, mercurous oxide or any other suitable or desirable thermochromatic material which is responsive in an appropriate temperature range. When liquid crystal is used it is desirable to apply a coloring substance 28a to the surface of the base layer backing the liquid crystal coating to enhance the optical properties of the liquid crystal.

Long and continuous exposure to ultraviolet radiation may cause deterioration of the color and temperature responsive chromatic characteristics in the thermochromatic material. This is particularly true where a propane tank is mounted externally of a camping trailer and exposed to sunlight for long periods of time. To prevent this deterioration the liquid level gauge may include an additional layer over the thermochromatic layer 28 in the form of an optically transport ultra-violet filter layer 36. A polyvinyl fluoride material approximately 1 mil in thickness is an example of suitable material to serve as an ultra-violet filter.

A simple, economical liquid level gauge has been described which can be applied to any existing container without the use of special tools or equipment and which requires no auxiliary equipment. It is a direct reading gauge not subjected to attack by corrosive materials within the tank and which may be readily and repeatedly removed, replaced and relocated. It provides a rapid response which can easily be read. Certain heat insulating characteristics of similar prior art devices have been eliminated to provide improved heat conduction and color contrast. It provides a substantial simplification and reduction in complexity and number of components required in comparison with previously known devices.

Although a certain specific embodiment of the invention has been shown and described for use in a particular type of container for the purpose of illustration, it will be apparent that in accordance with the broader aspects of the invention various modifications and other embodiments are possible. For example, the liquid level gauge of this invention may be used with other and different types of containers and other and different materials within the container, including but not limited to flowable granular material as well as other liquids. It may be used with either sealed, closed or open containers. It is to be understood, therefore, that the invention is not limited to the specific arrangement shown but in its broadest aspects it includes all equivalents embodiments and modifications which come within the scope of the invention.

I claim:

1. In a direct reading external liquid level gauge for measuring the contents level of opaque containers of magnetic material, an elongate strip of material including a base layer having a thermo- thermochromatic coating, the improvement comprising said base layer formed of extremely thin heat conducting metallic material having magnetic material over its entire longitudinal extent for removably retaining said gauge on the container surface, whereby said elongate strip can be repeatedly secured to, removed from and relocated on containers of magnetic material.

2. A direct reading external liquid level gauge according to claim 1 characterized in that said base layer is of thin material of the order of 0.001 inch thickness.

3. A direct reading external liquid level gauge according to claim 1 characterized in that said means for repeatedly securing and removing said elongate strip to and from a container comprises a magnetized base layer whereby said strip is removeably securable to a conductor of magnetic material.

* * * * *